Figure 1:
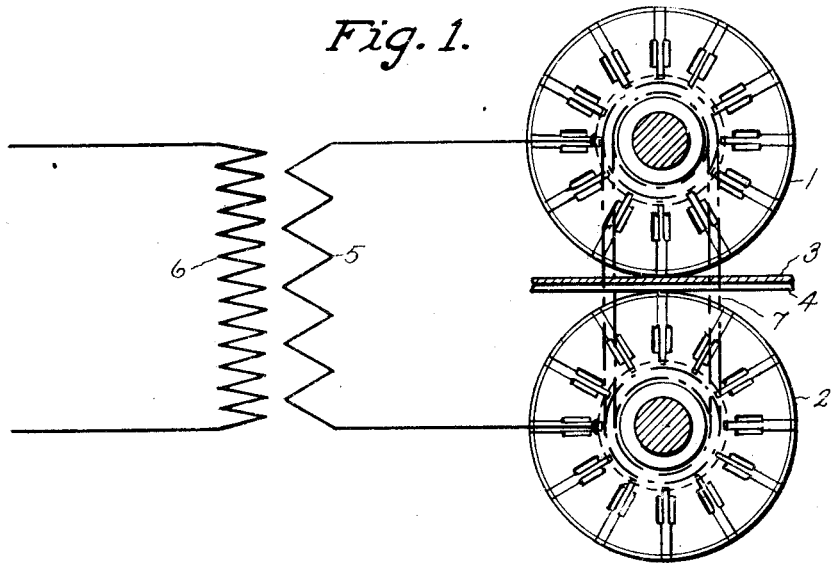

Aug. 4, 1925.

E. THOMSON

LINE WELDING

Filed Aug. 11, 1924

Inventor,
Elihu Thomson,
by *Alexander S. Lunt*
His Attorney.

Patented Aug. 4, 1925.

1,548,691

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

LINE WELDING.

Application filed August 11, 1924. Serial No. 731,260.

*To all whom it may concern:*

Be it known that I, ELIHU THOMSON, a citizen of the United States, residing at Swampscott, in the county of Essex, State of Massachusetts, have invented certain new and useful Improvements in Line Welding, of which the following is a specification.

My invention relates to machines for electric line welding by the resistance process, and particularly to an improved arrangement and construction of electrodes for such machines.

In electric welding by the resistance process the work to be welded is brought to a welding temperature by an electric current passed through the articles to be welded. The line welding of sheets is customarily practiced by passing the welding current through a pair of overlapped sheets to be welded the current entering and leaving the sheets by electrodes engaging opposite sides thereof, the line weld being produced by a relative motion of transverse between the work and the welding electrodes in the line of the desired weld. It is common to use a pair of rotatable disc electrodes of conducting material which exert exert pressure upon opposite sides of the work to be welded and it is also common to use but one rotatable electrode and a cooperating mandrel on which one of the sheets to be welded lies. Difficulties have been experienced with the use of such machines owing to buckling and burning of the work. Alternating current is customarily used for welding. The welding electrodes are connected in any suitable way to the secondary of a transformer whose primary is supplied from a suitable source of supply.

In order to lessen the difficulties due to buckling and burning of the work, it has been proposed to interrupt the welding circuit rapidly and inasmuch as it is not practicable to build an interrupter to interrupt successfully the large welding currents which it is necessary to use, the circuit interrupting device has been applied to the primary circuit of the transformer. In my opinion one of the reasons why such interrupted current gives improved results is that the interruptions of welding current divide up the welding operation into successive short periods during which the work is alternately heated and allowed to cool slightly. Where the necessary effective value of welding current is supplied continuously, the rotating disc electrode sinks relatively deeply into the work and a small wave of hot metal is forced up ahead of the electrode and travels along the work with the electrode. Where the welding current is periodically varied from a high value to a low value, this wave of metal is permitted to cool slightly during the interval that the current is interrupted and the electrode is consequently permitted to roll or climb up on the wave which is somewhat hardened and serves as a small ridge upon which the electrode bears when the welding current is next applied. This ridge is then softened and depressed by the welding electrode, thereby forming a new ridge ahead of the electrode. In this way a continuous tight weld may be produced if the speed at which the electrodes are moved is properly related to the periodicity of the interruptions of the welding current.

In accordance with my invention, a periodic variation of the welding current is produced at the welding electrodes and no device for interrupting or varying the primary current of the transformer is necessary.

My invention will be better understood from the following description taken in connection with the accompanying drawing, and its scope will be pointed out in the appended claims.

Figure 2:
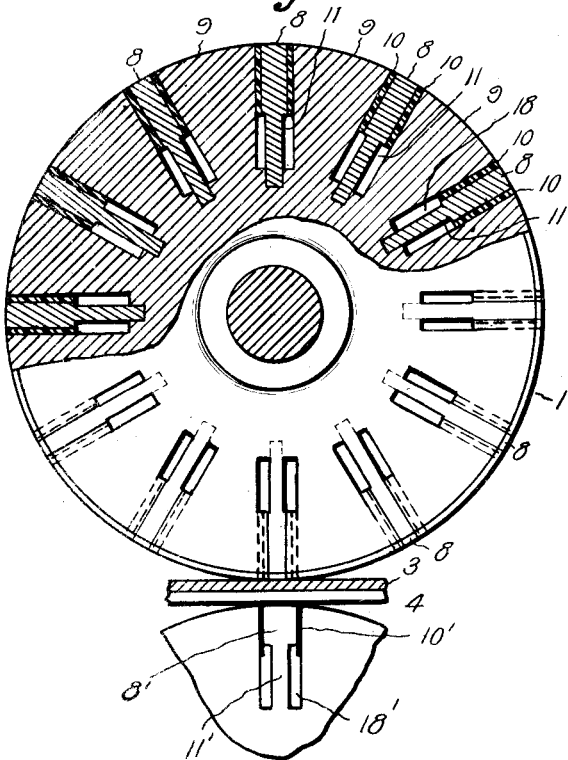
Figures 3, 4:
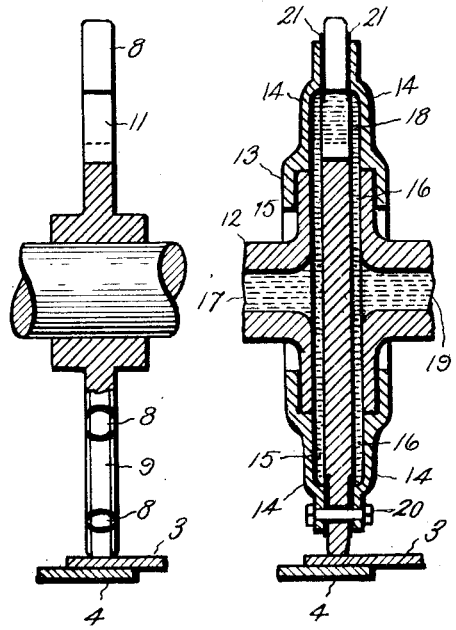

In the drawing, Fig. 1 diagrammatically represents a welding machine embodying my invention comprising a pair of rotatable electrodes in cooperative relationship to the work to be welded and a source of supply for the welding current; Fig. 2 is an enlarged view partly in section showing a pair of electrodes in cooperative relationship to the work, the upper electrode illustrating more clearly the construction of the electrodes shown in Fig. 1 and the lower electrode illustrating a modified construction: Fig. 3 is a side view partly in section of the upper electrode of Fig. 2, and Fig. 4 is a sectional view of a welding electrode embodying my invention provided with cooling means.

Referring to Fig. 1, a welding machine embodying my invention is diagrammatically indicated wherein the rotatable welding electrode discs 1 and 2 engage opposite sides of the work to be welded, represented as a pair of overlapped sheets 3 and 4. The electrodes 1 and 2 are supplied with welding current from any suitable source illustrated as the secondary winding 5 of a transformer of which 6 is the primary winding. Any suitable means, examples of which are well known in the art of line welding machines, may be provided for causing the electrodes to exert pressure upon the work so as to bring the sheets to be welded into intimate engagement at the point of welding and any suitable means, examples of which are also well known to the art, may be provided for producing relative movement between the electrodes and the work so that the electrodes roll along the line of the weld. For a purpose hereinafter described suitable gearing or the equivalent, indicated as a chain 7, is provided for causing the electrodes 1 and 2 to operate at the same speed.

As shown more clearly in the upper portion of Fig. 2 the electrodes each comprise a disc of conducting material provided with substantially radial slots spaced around the periphery thereof, a conducting segment 8 being located in each slot so that the segments 8 alternate around the periphery of the electrode with the segments 9 of the disc. Each segment 8 is in conductive connection with the central portion of the disc at the bottom of the slots but is insulated from the adjacent segments 9 at the peripheral portion of the disc by means of mica 10 or other suitable insulation. The segments 8 and 9 thus provide a plurality of paths for the flow of current from the central portion to the periphery of the electrode. The periphery of the electrode is smooth and the insulation 10 narrow, since insulation for but a very low voltage is needed, so that the welding circuit is not broken during rotation of the electrode, the current being merely successively transferred from one segment to the next as the segments successively engage the work.

In order to vary the current periodically between the high value desired for welding and the relatively lower value desired for the cooling interval as the electrode rolls along the line of the weld, I construct the electrode so that the impedance to the flow of current in the paths leading to the segments 8 is greater than that of the paths leading to the segments 9. This difference in the impedance to the flow of current to the two groups of segments may be secured in a number of different ways. As shown in the drawing the segments 8 comprise inserts of conducting material which are secured in the central portion of the disc at the bottom of the slots. These inserts may be composed of material having a higher resistance than the material of which the body of the disc is made, which may, for example, be composed of copper. The increased resistance of the paths leading to the segments 8 may also be provided by reducing the cross-section of the segments 8 toward the bottom of the slots as shown at 11. A relatively small increase in resistance will serve to effect the desired reduction in current since the voltage applied to the electrodes in line welding machines is very low being in the neighborhood of 2 or 3 volts.

With the construction of electrode disc described, it will be apparent that the alternate segments 8 of the electrode present a greater resistance to the flow of current than do the remaining segments 9 located between segments 8. It thereby follows that as the electrode rolls along the line of the weld, the welding current is periodically varied between a high value and a lower value, thus securing the desired result. The welding current has the high value when flowing through the segments 9 and the lower value when flowing through the segments 8. Current is transferred from segment to segment without interruption of the circuit.

The electrode may be cooled by directing streams of cooling fluid thereon, as is well known in the art, but I prefer to provide means for circulating cooling fluid, which may for example be water, arranged as shown in Fig. 4 wherein the hub 12 of the electrode is bored out to provide an opening at each side and is constructed with a shouldered portion 13 which cooperates with flanges 14 on each side of the disc to provide a chamber or jacket around the electrode at the periphery of the portion 13. A plurality of passages 15 and 16 are provided leading from the openings in the hub 12 to the peripheral chamber whereby cooling fluid may be circulated through the electrode, entering for example at the opening 17, passing through the passage 15 to the peripheral chamber, thence through the openings 18 at the inner portions of the slots containing segments 8, thence through the passages 16 to the discharge opening at 19. This arrangement provides effective cooling of the body of the electrode disc and also effective cooling of the reduced portions of segments 8 in which heat is developed by the flow of current through the resistance of such portions. The side flanges 14 may be riveted or bolted to the disc as indicated in Fig. 4 at 20. The flanges 14 may be spaced from the sides of the disc and insulated therefrom by insulation 21 so that the current will be forced to flow through the hub and body of the disc to the peripheral segments instead of directly from the hub through the flanges to the peripheral segments. If desired, openings may be left between the peripheral portions of the side flanges and the disc to allow cooling fluid to run down the sides of the segments to the work to provide further cooling.

Instead of making the segments 8 of separate inserts, as shown in the upper portion of Fig. 2, such segments may be integral with the body of the disc 9, as indicated at 8' in the lower portion of Fig. 2. The disc itself is here cut so as to shape each segment and provide the resistance isthmus 11' which connects the segment 8' with the central portion of the disc. In this case the disc is sliced or cut substantially radially inward to provide space for the insulation 10' and the disc is cut through in two places to form the openings 18' and isthmus 11'.

Where both welding electrodes are rotatable, as in Figs. 1 and 2, the segments of the discs having the higher resistance to the flow of current should be arranged to engage the work simultaneously and the alternate segments through which the high current flows should also engage the work simultaneously. This is accomplished by gearing the segments together, as, for example, by the chain 7 shown in Fig. 1.

While I deem it preferable to provide both electrodes with the segments for varying the resistance to the flow of current whereby the electrodes each provide a part of the resistance to reduce the current while the higher resistance segments are in contact with the work, it is possible to use but one electrode with the periphery divided into segments, providing the paths of different resistance, and use a plain disc for the other electrode. The periodic variation in current will then be produced by the segmentally constructed disc alone. It is also possible to use my segmental electrode in cooperation with a mandrel which may be either an ordinary plain mandrel or a mandrel provided with segments arranged to provide alternately higher and lower resistance to the flow of current.

While I have, in accordance with the patent statutes, described certain specific structural embodiments of my invention, modifications and variations will suggest themselves to those skilled in the art without departing from the spirit of my invention, the scope of which is defined in the annexed claims.

What I claim as new and desire to secure by Letters Patent of the United States, is:

1. An electric line welding machine comprising a pair of electrodes arranged to exert pressure upon the work to be welded and conduct welding current therethrough, one of which electrodes is a rotatable disc electrode arranged to roll along the line of the weld, characterized by the fact that one of said electrodes is constructed and arranged to vary periodically the resistance to the flow of welding current, as the rotatable disc electrode rolls along the line of the weld, while maintaining the welding circuit unbroken at the electrodes.

2. An electric line welding machine comprising a pair of rotatable disc electrodes arranged to exert pressure upon opposite sides of the work to be welded and conduct welding current therethrough, said electrodes being provided with conducting segments spaced around the peripheries thereof, adjacent segments of each disc being insulated from each other at the peripheries of the discs a plurality of paths being provided by said segments for the flow of current to the periphery of each disc, alternate paths around the periphery of each disc being arranged to have a resistance relatively higher than the resistance of the remaining paths, the segments of said discs having the higher resistance to the flow of current being arranged to engage the work simultaneously, and means for maintaining said discs in fixed speed relationship during rotation thereof, whereby during welding, the current is periodically varied between a high value and a lower value as said discs roll along the line of the weld.

3. An electrode for line welding machines of the resistance type, said electrode having a peripheral surface composed of conducting segments, said segments being connected in two groups comprising alternate segments respectively and means arranged to impede the flow of current to one group of segments.

4. An electrode for electric line welding machines of the resistance type wherein the electrode is arranged to exert pressure upon and conduct welding current into the work to be welded while the electrode and work more relatively, comprising a disc of conducting material constructed and arranged to provide a plurality of paths through which welding current may flow to different portions of the periphery of the disc, said paths to successive portions around said periphery being arranged to have different resistances.

5. An electrode for electric line welding machines of the resistance type wherein a rotatable electrode is arranged to exert pressure upon and conduct welding current into the work to be welded while the electrode and work move relatively, characterized by the fact that the periphery of said electrode is divided into conducting segments insulated from each other at said periphery and electrically connected together at the central portion of the electrode and by the further fact that the conductivity of the connection between each alternate segment and the center of the disc is less than the conductivity of the connection between the remaining segments and the center of the disc.

6. An electrode for resistance line welding machines comprising a rotatable disc provided with a smooth periphery divided into segments insulated from each other at said periphery and electrically connected at the central portion of the disc whereby current may flow from the central portion of the disc to said peripheral segments in independent paths, and means providing an impedance to the flow of current in the paths to alternate segments around the periphery whereby the electrode is adapted to vary the flow of current periodically between a high value and a lower value.

7. An electrode for resistance line welding machines comprising a rotatable disc provided with a smooth periphery divided into segments insulated from each other at said periphery and electrically connected at the central portion of the disc, alternate segments being constructed to provide, a resistance which is relatively higher than the resistance of the segments between said alternate segments whereby the electrode is adapted to vary the flow of current periodically between a high value and a lower value.

8. An electrode for resistance line welding machines comprising a rotatable disc of conducting material, said disc being provided with substantially radial slots spaced around the periphery thereof, conducting inserts arranged in said slots extending from the central portion of the disc to the periphery thereof, means for insulating said inserts from the sides of the slots at the peripheral portion of the disc, said inserts having a reduced cross-section at the inner portion of said slots whereby the resistance to the flow of current through said conducting inserts is increased.

9. An electrode for resistance line welding machines comprising a rotatable disc of conducting material having segments of conducting material arranged in slots around the periphery of said disc in conductive connection with the central portion of said disc at the bottom of said slots and insulated from the sides of said slots at the peripheral portion of the disc, said segments having a cross-section smaller than that of the slots at the inner portions of the slots whereby the resistance to the flow of current through said conducting segments is increased and whereby openings are provided through the disc at the inner portions of said slots, and means arranged to provide a circulation of fluid through said openings to cool the electrode.

In witness whereof, I have hereunto set my hand this 5th day of August, 1924.

ELIHU THOMSON.